C. J. ELLIOTT & H. B. McCOOL.
Water-Bibb or Cock.
No. 209,161. Patented Oct. 22, 1878.
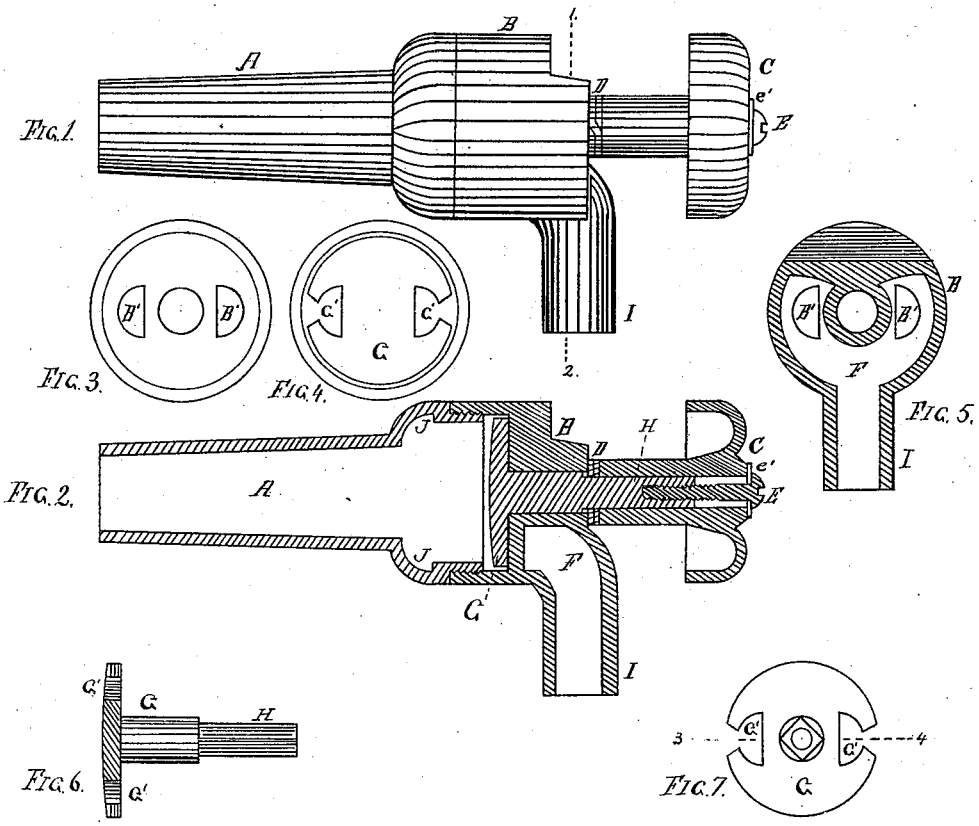
ATTEST:
INVENTORS:
Charles J. Elliott
Horace B. McCool

UNITED STATES PATENT OFFICE.

CHARLES J. ELLIOTT AND HORACE B. McCOOL, OF POTTSVILLE, PA.

IMPROVEMENT IN WATER BIBBS OR COCKS.

Specification forming part of Letters Patent No. 209,161, dated October 22, 1878; application filed April 4, 1878.

*To all whom it may concern:*

Be it known that we, CHARLES J. ELLIOTT and HORACE B. McCOOL, both of Pottsville, Schuylkill county, Pennsylvania, have invented a new and useful Improvement in Water Bibbs or Cocks, of which the following is a specification:

The invention relates to water bibbs or cocks used for tapping, stopping, checking, or controlling the flow of water through pipes or at the extremity of pipes.

Heretofore water bibbs or cocks have been made with soft-metal, leather, gum, or fibrous washers, which, in connection with a compression device, formed the valve of the bibb or cock, or ground plugs were inserted in ground sockets to form the working part of the cocks. These methods are objectionable, because the washers wear out rapidly and the sockets containing the ground plugs become enlarged, and in consequence both kinds of cocks soon leak and become worthless. Most bibbs or cocks heretofore made are so constructed that the pressure of water tends to open the valves or closing devices, and in nearly all of them the washers or valves are removed from their seatings every time the water is allowed to flow through them, which allows sediment and grit to accumulate between the wearing-surfaces, and this is ruinous to the bibb or cock.

Our invention does away with all washers and ground plugs and sockets, and our valve never leaves its seating, so that no sediment or foreign substance can get between the wearing-surfaces of the valve and its seating. In our invention the pressure of the water tends to tighten and close the valve, which alone is a decided advantage over the washer-cocks.

The object of our invention is to provide a water bibb or cock that is simple in construction, cheap, effective in operation, and that will not easily get out of order.

The invention consists in the arrangement of a flat-faced valve having a suitable opening or openings in it for the passage of water, and fitting closely to its seating, with a corresponding opening or openings in it, and the valve being operated by a handle device, to be further described hereinafter.

In the accompanying drawing, in which similar letters of reference indicate like parts, Figure 1 is a full view of our improved water bibb or cock; Fig. 2, a vertical longitudinal section of the same. Fig. 3 shows the seating against which the valve works. Fig. 4 shows the back of the valve in its position for operation. Fig. 5 is a vertical cross-section of Fig. 1 through the line 1 2. Fig. 6 shows the valve in section, with its stem shown in full; and Fig. 7 is a front view of the valve.

In Fig. 1, A and B form the body of the bibb or cock. C is the handle which operates the valve. D is a spring which takes up any and all wear of the valve. E is a set-screw which secures the handle to the valve-stem, and $e'$ is a washer. I is the nozzle or discharging-spout of the bibb or cock.

In Fig. 2, G is the valve, having the square stem H, which fits into the stem of the handle C. F is the water-way in the section of the bibb or cock B, and leads out of the nozzle I. The sections A and B are screwed together, as shown.

In Fig. 3 the valve-seating is shown, having the water-passages B' B' cut out, so as to allow the water to pass into the passage F, as shown again in Fig. 5.

Fig. 4 shows the valve in its place, with the passages G' G' turned so as not to show the openings B' B' in the valve-seating.

Figs. 6 and 7 show the valve, with its passages for water, and the stem part of which is formed round, and the end H being squared to fit the handle C.

The operation of the device is as follows: The water enters the bibb or cock through the opening in A, and passes through the passages G' G' in the valve G, and through the passages B' B' in B, and thence through the water-way F and out of the discharging-nozzle I. By simply turning the handle C a half-turn the plain surface of the valve G is brought over the passages B' B' in B, and the water ceases to flow through the bibb or cock. We form an enlarged recess, as shown at J J in Fig. 2, and when the water is turned off suddenly the still water in this recess serves to cushion the suddenly-increased pressure caused by the closing of the valve, and this cushioning effectually stops the knocking or rumbling noise which is heard in the water-pipes where common bibbs or cocks are used and turned off suddenly.

It will be readily seen that, as our valve does not leave its seating, no dirt or sediment can get under it, and it will also be seen that the pressure of the water serves to hold it firmly to its place. Should the valve wear or the set-screw become loosened the spring D will take up all the lost motion by springing open slightly.

The arrangement of the handle, the spring, and the joining together of the cock in sections are not new devices, as they have been known and described before; but the combination of this arrangement in connection with our invention of introducing a ground metal valve with a solid ground metal seating in the body of the cock, and the forming of an enlarged recess or offset back of the valve to cushion the pressure of water when the valve is closed suddenly, is a marked and distinctive improvement in the art of making bibbs or cocks which has never before been known or used.

What we claim is—

1. The water bibb or cock herein described, having the valve G, fitting and working against a ground metal seating in B, and provided with suitable openings for the passage of fluids, substantially as shown.

2. An enlarged recess or offset, J, back of or below the valve in a water bibb or cock, for the purpose of cushioning the pressure of water when the valve is closed suddenly.

CHARLES J. ELLIOTT.
HORACE B. McCOOL.

Witnesses:
 JNO. A. NASH,
 B. BRYSON McCOOL.